(12) United States Patent
Stamps et al.

(10) Patent No.: US 7,243,938 B2
(45) Date of Patent: Jul. 17, 2007

(54) ASSISTIVE MOBILITY DEVICE

(76) Inventors: Douglas Wayne Stamps, 5645 N. Cypress St., Newburgh, IN (US) 47630; Janice Lynn Stamps, 5645 N. Cypress St., Newburgh, IN (US) 47630; Samuel Charles Giesting, 5272 S. 700 East, Waldron, IN (US) 46182; Edward Thomas Cooper, III, 49 N. Saint Phillips Rd., Evansville, IN (US) 47712; Daniel Edward Schenk, 3009 Hillview La., Mt. Vernon, IN (US) 47620; Jarod Daniel Stoll, RR 1 Box 250, Montgomery, IN (US) 47558; Adam Jay Nisley, 3126 Wimberg Ave., Evansville, IN (US) 47720

( * ) Notice: Subject to any disclaimer, the term of this patent is extended or adjusted under 35 U.S.C. 154(b) by 207 days.

(21) Appl. No.: 11/049,572

(22) Filed: Feb. 3, 2005

(65) Prior Publication Data

US 2005/0173888 A1 Aug. 11, 2005

Related U.S. Application Data

(60) Provisional application No. 60/542,801, filed on Feb. 5, 2004.

(51) Int. Cl.
*A61G 5/10* (2006.01)

(52) U.S. Cl. .................. 280/304.1; 280/647; 280/47.4

(58) Field of Classification Search ................ 280/647, 280/650, 47.39, 47.4, 304.1
See application file for complete search history.

(56) References Cited

U.S. PATENT DOCUMENTS

| | | | |
|---|---|---|---|
| 3,897,857 A | 8/1975 | Rodaway | |
| 4,084,663 A | 4/1978 | Haley | |
| 4,320,818 A | 3/1982 | Knoche | |
| 4,623,043 A | 11/1986 | Babilas | |
| 4,639,012 A * | 1/1987 | Jensen | ........................ 280/642 |
| 5,145,197 A * | 9/1992 | Gatti | ........................ 280/304.1 |
| 5,203,433 A | 4/1993 | Dugas | |
| 5,217,239 A * | 6/1993 | Koet | ........................ 280/250.1 |
| 5,379,866 A | 1/1995 | Pearce et al. | |
| 5,480,179 A | 1/1996 | Peacock | |
| 5,592,997 A | 1/1997 | Ball | |
| 5,799,756 A | 9/1998 | Roberts et al. | |
| 5,894,912 A | 4/1999 | Dobben | |
| 5,984,334 A | 11/1999 | Dugas | |
| 6,012,555 A | 1/2000 | Duran et al. | |
| 6,086,086 A * | 7/2000 | Hanson et al. | .............. 280/650 |
| 6,092,824 A | 7/2000 | Ritchie et al. | |
| 6,183,002 B1 * | 2/2001 | Choi et al. | .................. 280/647 |
| 6,264,007 B1 | 7/2001 | Norton et al. | |
| 6,279,936 B1 | 8/2001 | Ritchie et al. | |
| 6,315,306 B1 | 11/2001 | Fernie et al. | |
| 6,341,671 B1 | 1/2002 | Ebersole | |
| 6,352,138 B1 | 3/2002 | Duran et al. | |
| 6,371,503 B2 | 4/2002 | Ritchie et al. | |
| 6,409,195 B1 | 6/2002 | Adams | |
| 6,684,969 B1 | 2/2004 | Flowers et al. | |
| 6,715,780 B2 | 4/2004 | Schaeffer et al. | |
| 6,739,610 B2 | 5/2004 | Conners et al. | |
| 6,880,845 B1 * | 4/2005 | Broyles et al. | .......... 280/250.1 |
| 6,976,698 B2 * | 12/2005 | Kuiken | ........................ 280/647 |
| 7,090,240 B2 * | 8/2006 | Papac | ........................ 280/647 |

* cited by examiner

*Primary Examiner*—Christopher Bottorff

(57) ABSTRACT

An assistive mobility device is provided that includes an automatic positive locking system, which permits an operator to move the assistive mobility device when an actuator is engaged and automatically lock the assistive mobility device when the actuator is disengaged. The assistive mobility device includes a braking system, stowable footrest and armrests, and an adjustable back, which all require the single-handed operation of the operator to function. The collapsible footrest is stowed under the seat permitting an occupant optimal entry into or exit from the assistive mobility device. The assistive mobility device can be formed from non-corrosive materials, including stainless steel, composite fibers, nylon, and plastics, for use in aquatic environments.

29 Claims, 6 Drawing Sheets

FIG.2

ASSISTIVE MOBILITY DEVICE

CROSS-REFERENCES TO RELATED APPLICATIONS

This application claims the benefit of Provisional Patent Application No. 60/542,801, filed Feb. 5, 2004.

BACKGROUND

1. Field of Invention

The present invention relates generally to wheelchairs and, more specifically, to assistant-driven wheelchairs. The present invention is related to braking and locking mechanisms for wheelchairs. The present invention is also related to a collapsible footrest.

2. Discussion of Prior Art

A unique set of issues must be addressed for assistive mobility devices, such as an assistant moving a physically disabled person in a wheelchair. An assistant must move the wheelchair user up and down ramps safely, often under adverse environmental conditions. For example, the wheelchair or ramp may be wet from use in rain, a shower, or from pool therapy. The wheelchair must remain immobile while an assistant helps a person into and out of the wheelchair and remain immobile until the assistant is ready to transport the person. Appropriate use of braking and locking mechanisms are required for these unique applications. Often the assistant must support the person with one hand while helping the person into or out of the wheelchair.

Different types of manual locking mechanisms for wheelchairs are described in prior art. U.S. Pat. No. 3,897,857 to Rodaway describes a helical spring that applies braking frictional force to a coaxial brake drum attached to a wheel hub when actuated by a pivoted lever. The helical spring may also be used to lock the wheelchair when the linkage of the pivoted lever is placed in an over center position. However, the mechanism is not a positive locking mechanism and cannot assure the wheelchair will remain stationary when the components of the mechanism are wet. U.S. Pat. No. 5,379,866 to Pearce et al, U.S. Pat. No. 5,799,756 to Roberts et al, and U.S. Pat. No. 6,341,671 to Ebersole all disclose manual positive locking mechanisms. Positive locking is achieved either by the mating of two opposing ratchet faces, a latch into a splined disk, or a sliding plunger into a complementary hole on disk. In each case, one component is stationary while the other is rotatable and attached to the shaft or hub of the wheel. None of these locking mechanisms engage automatically, leaving the occupant of the wheelchair in a potentially precarious situation if the user forgets to lock the wheels.

An improvement over the manual locking mechanisms is described in U.S. Pat. No. 4,320,818 to Knoche, U.S. Pat. No. 4,623,043 to Babilas, U.S. Pat. No. 5,894,912 to Dobben, U.S. Pat. No. 6,092,824 to Ritchie et al, U.S. Pat. No. 6,279,936 to Ritchie et al, and U.S. Pat. No. 6,371,503 to Ritchie et al. These patents describe seat-activated braking devices that automatically engage a lock when a person leaves the wheelchair and automatically disengages the lock when the person occupies the wheelchair again. The lock is a friction brake that consists of a member that presses into the wheel or tire of the wheelchair. A variant of this idea is disclosed in U.S. Pat. No. 6,739,610 to Connors et al. This patent describes an automatic seat-activated friction brake where a member extends behind the wheelchair to make contact with the ground instead of a brake pressing into a wheel as described in the previous patents. However, all of frictional brake methods suffer from the problem that the wheelchair may slip when the surfaces are compromised, for example, when the surfaces are wet, greasy, and the like.

A number of automatic seat-activated positive-locking systems have been disclosed that overcome the problems associated with friction brakes. U.S. Pat. No. 5,203,433 to Dugas describes a positive locking system consisting of a rotatable locking member, such as a hexagonal nut, attached to the wheelchair hub that slides into or out of a cavity in a stationary locking bar as a result of the movement of the seat of the wheelchair. U.S. Pat, No. 5,984,334 to Dugas, U.S. Pat. No. 6,012,555 to Duran et al, and U.S. Pat. No. 6,352,138 to Duran et al all describe similar positive locking systems that consist of a rotatable gear attached to the wheelchair shaft or hub that mates with a stationary surface as a result of the movement of the wheelchair seat. Likewise, U.S. Pat. No. 6,264,007 to Norton et al describes a locking pin that slides into or out of a complementary hole in a rotatable member attached to the hub of the wheelchair based on seat action.

Automatic seat-activated locking systems have their application for a particular purpose: to prevent the wheelchair from rolling away as the occupant attempts to get into or out of the wheelchair. However, a unique set of circumstances arises when an assistant transports a wheelchair occupant. For example, a wheelchair must not only remain stationary when an assistant is helping a patient into or out of the wheelchair but must also remain locked until the assistant is ready to transport the patient. From the point of view of assisted wheelchair movement, all occupant-operated automatic locking systems have the disadvantage that the occupant can move when seated. This is not always desirable when an assistant operates the wheelchair.

U.S. Pat. No. 6,315,306 to Fernie et al discloses an automatic locking mechanism that remains locked until an assistant releases the friction brakes. However, friction brakes are not a positive locking system and allows the possibility of slippage under adverse surface conditions, like when the components are wet or greasy. U.S. Pat. No. 4,084,663 to Haley discloses an automatic positive locking system that remains locked until the assistant releases the locks. The locking mechanism consists of a slidable rod that is biased by a spring to reside between the spokes of the wheel. A pull cable is used to release the rod from the spokes. The cable is offset relative to the rod and thus is susceptible to binding when activated by the assistant. This invention suffers the disadvantage that the wheelchair can still move forwards and backwards by a distance allowed by the rod between two spokes. This can permit unacceptable movement of the wheelchair for wheels that have only a few spokes. No travel of the wheelchair should be permitted in the locked position to prevent the patient from becoming off balanced and sustaining an injury. Furthermore, for safety purposes, spokes are covered on some wheels to prevent injury to the occupant's hand. This invention would not work with this solid or covered type of wheel and it also does not work well with wheels having a few solid spokes with wide spaces between the spokes.

U.S. Pat. No. 5,480,179 to Peacock, U.S. Pat. No. 6,409,195 to Adams, and U.S. Pat. No. 6,715,780 to Schaeffer et al disclose the use of disc brakes for wheelchair braking. As described in the prior art, the disc brakes are operated by the occupant and are normally in the released (off) position. However, in assistive mobility devices, it is preferable that the disc brakes be in an activated (on) position and released (off) by the action of the assistant.

One typical configuration of a wheelchair footrest is to have two horizontal footplates, one on each side of the wheelchair. The footplates can be pivoted into a vertical position to allow the occupant into and out of the wheelchair. However, a disadvantage is that the stowed footrests still protrude from the bottom of the wheelchair and can present a tripping hazard. Some footrests are attached to a rod, which can rotate about the vertical legs on the wheelchair frame. A disadvantage to both designs is that each of the two footrests must be moved separately.

U.S. Pat. No. 5,592,997 to Ball discloses a footrest that consists of a single footplate. The footplate rests on two bars, which can slide into or out of the frame of the wheelchair. Before the footrest can be stowed, the horizontal footplate must pivot into a vertical position. The pivot points are at the front end of the bars. To stow the footrest, the footplate is lifted to a vertical position and then the rods slide towards the back of the wheelchair. The footplate rests against the front of the wheelchair. To retrieve the footrest, the bars are pulled out allowing the footplate to fall back in a horizontal position. However, once the footplate is in a horizontal position, the footrest must be pushed slightly back towards the wheelchair so that the footplate slides under a lip in the frame. The lip ensures that the occupant does not flip the footplate up when stepping on it. However, a potential hazard could result if an assistant is not careful about securing the footrest and the occupant steps on the footplate.

U.S. Pat. No. 6,684,969 describes a footrest that consists of a single footplate. The footrest is normally in a stowed position, which is when the footplate is vertical and next to the front of the wheelchair. The footplate pivots at the front bottom part of the wheelchair frame to a horizontal operative position. A torsion spring biases the footplate to the stowed position. A disadvantage for this invention and the invention disclosed in U.S. Pat. No. 5,592,997 is that the position of the stowed footrest does not permit an ergonomic dismounting from the wheelchair. The best way to get out of a wheelchair is to place your feet slightly under the seat so that your center of gravity is stable. These inventions do not permit the occupant's feet to be placed under the seat.

Thus it can be seen that there is a need for a wheelchair that provides for greater safety for the occupant while being transported by an assistant. There is further a need for a wheelchair that will not move when parked. There is a need for a wheelchair that maximizes occupant safety and assistant safety when lifting an occupant from the chair or when assisting the occupant back into the chair. There is a need for a wheelchair that simplifies the tasks of an assistant, thus providing maximum safety to both the occupant and assistant.

Objects and Advantages

To overcome the limitations and disadvantages in the prior art described above, several objects and advantages of the present invention are disclosed to meet the aforementioned needs.

Accordingly, it is an object of the present invention to provide a method for the single-handed operation of features on an assistive mobility device to simplify the tasks of an assistant. This is desirable so that an assistant has one hand available to secure the occupant.

Another object of the present invention is to provide an assistive mobility device with an automatic positive locking system, which permits the mobility device to remain stationary until the assistant desires movement. The assistive mobility device remains stationary until an assistant engages an actuator of the positive locking system, which frees the wheels of the mobility device to move. The positive locking system automatically locks when the assistant releases the actuator.

Another object of the invention is the provision for an automatic braking means, which is in a normally clamped state until the assistant engages an actuator for the braking means. The braking means returns automatically to the clamped state when the assistant fully releases the actuator.

Another object of the present invention is to provide an assistive mobility device with a collapsible footrest that can be stowed under the seat, which conveniently stores the footrest and allows the user to place their feet slightly under the seat for optimal entry into and exit from the mobility device.

Another object of the present invention is to provide an assistive mobility device with stowable armrests, which allows the user entry into or exit from the mobility device from all sides except the back side.

Another object of the present invention is to provide an assistive mobility device with an adjustable backrest to accommodate the needs of different occupants.

Another object of the present invention is to provide an assistive mobility device with a seat belt to restrain the occupant so as to prevent an injury from a fall.

Another object of the invention is the provision for the assistive mobility device to be constructed of noncorrosive materials, which permits the use of the mobility device in adverse environments such as in rain, a shower, or in pool therapy.

Further objects and advantages will become apparent from a consideration of the drawings and ensuing description.

BRIEF DESCRIPTION OF THE DRAWINGS

FIG. 2 shows a perspective view from above of a wheelchair including arrows to show the movement of armrests and collapsible footrest;

REFERENCE NUMERALS IN DRAWINGS

Figure 1:
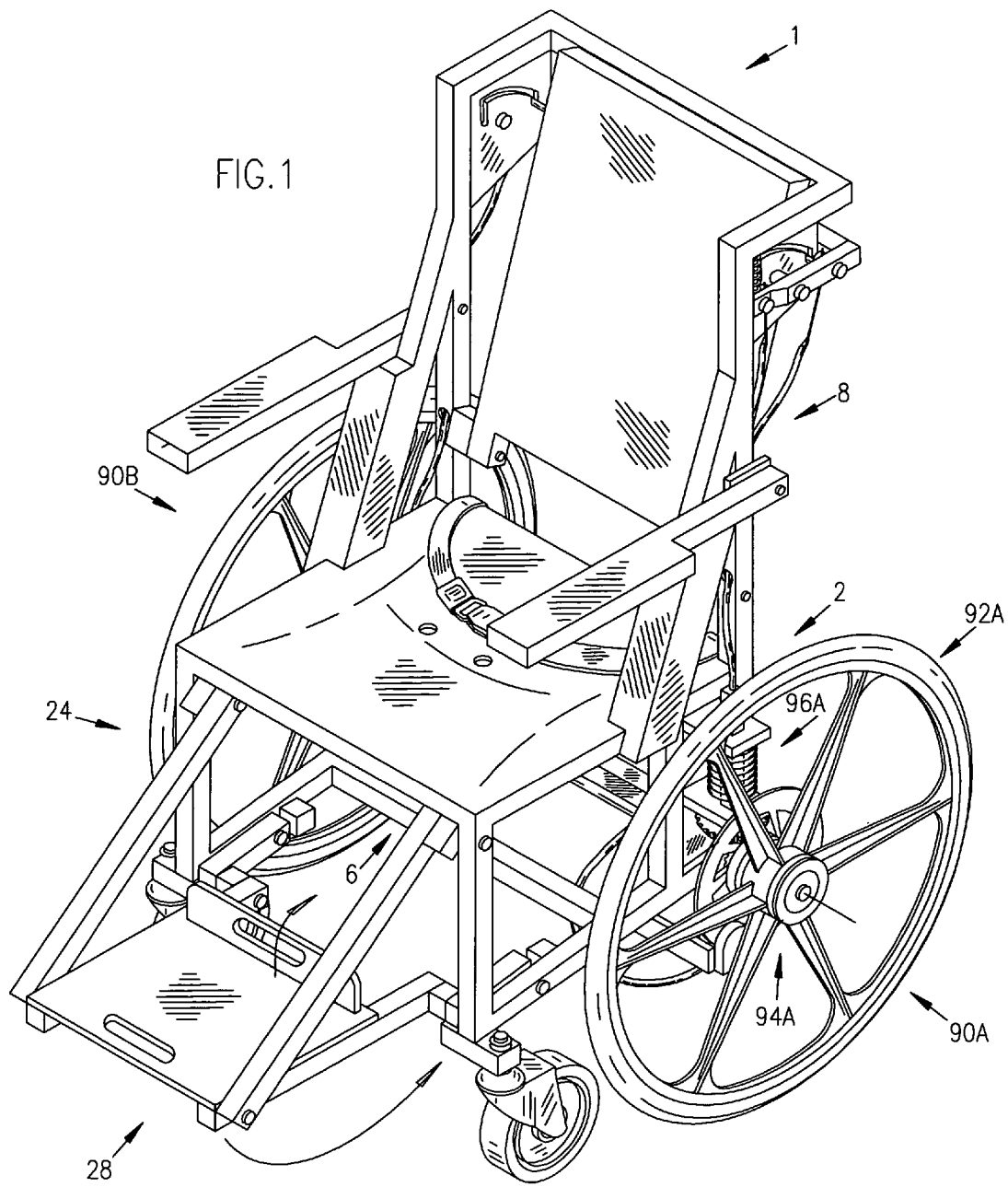
FIG. 1 shows a perspective view from above of a wheelchair.

| 1 | wheelchair | 2 | chair frame |
|---|---|---|---|
| 4 | seat support | 6 | chassis |
| 8 | back support | 10 | armrest supports |
| 12 | seat | 14 | wheel support bars |
| 16 | forward brace | 18 | rear brace |
| 20 | forward leg | 22 | rear leg |
| 24 | footrest | 26 | upper footrest support bar |
| 28 | foot support | 30 | lower footrest support bar |
| 32 | pivot pin | 34 | spacer |

-continued

| | | | |
|---|---|---|---|
| 36 | pivot pin | 38 | pivot pin |
| 40 | pivot pin | 42 | rear footrest stop |
| 44 | footplate | 46 | footplate support bar |
| 48 | heel stop | 50 | footplate slot |
| 52 | heel stop slot | 54 | caster support bar |
| 56 | caster wheel | 58 | back support bar |
| 60 | push-bar handle | 62 | seat back |
| 64 | pivot pin | 66 | seat back spacer |
| 68 | seat back guide plate | 70 | seat back guide plate slot |
| 71 | vertical cutouts | 72 | seat back rod |
| 80 | armrest | 81 | slot |
| 82 | pivot pin | 83 | pin |
| 84 | armrest guide plate | 90 | drive assembly |
| 92 | wheel assembly | 94 | brake assembly |
| 96 | locking assembly | 98 | axle |
| 99 | seatbelt | 100 | wheel |
| 102 | drive assembly support plate | 104 | rotor |
| 106 | brake pads | 108 | braking assembly support |
| 110 | braking assembly cable | 112 | actuator handle |
| 114 | bevel gear | 116 | bevel gear |
| 118 | sliding bar | 120 | coil spring |
| 122 | pin | 124 | lower locking assembly guide |
| 126 | upper locking assembly guide | 128 | locking assembly cable |
| 130 | pivot pin | 132 | spring |

SUMMARY

According to the invention, there is provided an assistive mobility device that requires only single-handed operation of the invention's features. In a more specific example of the invention, an assistant-driven wheelchair comprises a chair frame, which supports a seat and a backrest, a handle connected to the upper back of the chair frame, a chassis supporting the chair frame and four wheels, and an automatic positive locking system. The automatic locking system includes a rotatable locking member with surface indentations affixed to at least one of the wheels, a stationary locking member with surface indentations that mate the rotatable locking member, a locking actuator connected to the handle, and a cable means to connect the locking actuator to the stationary locking member. The locking actuator is biased by a spring to engage the locking members until disengaged by an assistant. The locking members reengage automatically when the assistant releases the actuator. The preferred embodiment of the invention incorporates a number of features.

According to a feature of the invention, a braking assembly is attached to at least one of the wheels. The braking assembly includes a braking means and a flexible braking assembly cable means connecting the braking means to the locking actuator. The actuator is biased by a spring to keep the braking means clamped until disengaged by an assistant. The braking means clamps automatically when the assistant fully releases the actuator.

According to a further feature of the invention, a collapsible footrest can be stowed under the seat, which removes a tripping hazard when the occupant gets into or out of the wheelchair. The stowed position also allows the occupant's feet to be placed slightly under the seat for better balance when exiting the wheelchair. The footrest includes a single footplate, which is less cumbersome to move than a conventional wheelchair with two footrests.

According to a further feature of the invention, an armrest is pivotably connected to the chair frame. The armrest contains a slot, which limits the range of motion from a substantially horizontal position to support the occupant's arm to a substantially vertical position that allows that occupant to get into or out of the wheelchair without impediment from the side.

According to a further feature of the invention, a back adjustment assembly is attached to the upper chair frame, which permits adjustment of the angle of recline to accommodate occupants who may be hypertonic or hypotonic. The back adjustment assembly consists of a pair of guide plates with slots, vertical cutouts in the slots, and a backrest rod that rests in a set of the vertical cutouts. The backrest is pivotably connected to the chair frame near the seat and the angle of the backrest is adjusted by lifting the backrest rod from one set of vertical cutouts and placing the rod in a different set of cutouts.

According to a further feature of the invention, a seat belt is attached to the chair frame to restrain the occupant from potential injury from a fall.

According to a further feature of the invention, the wheelchair is constructed of non-corrosive materials, including nylon, plastic, stainless steel, and composite fiber, that permit the use of the wheelchair in adverse environments, such as in rain, a shower, or a pool. The wheelchair can be constructed to not be buoyant, which permits a therapist to place pool therapy patients in a non-floating wheelchair.

DETAILED DESCRIPTION OF INVENTION

Figure 2:
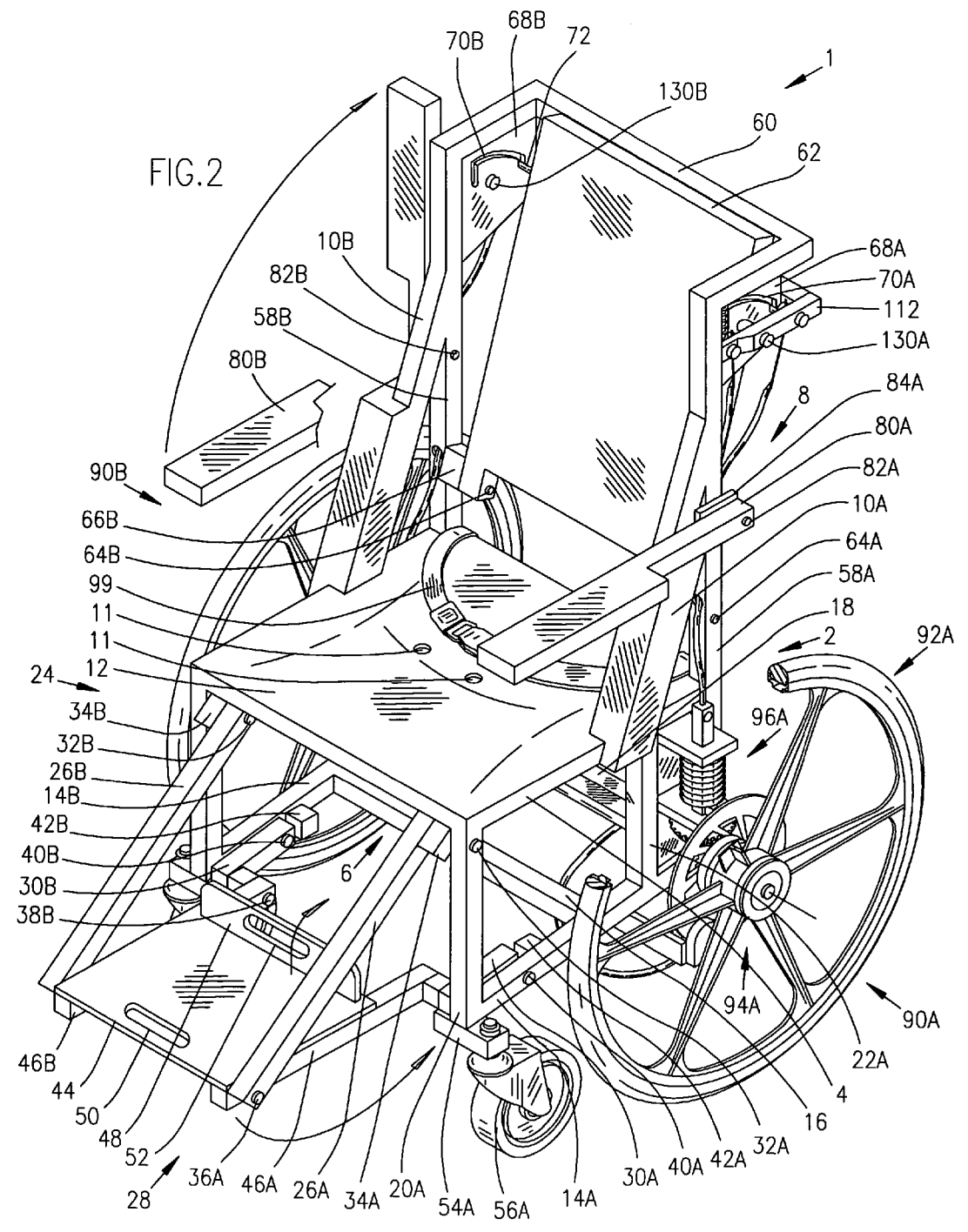
Figure 3:
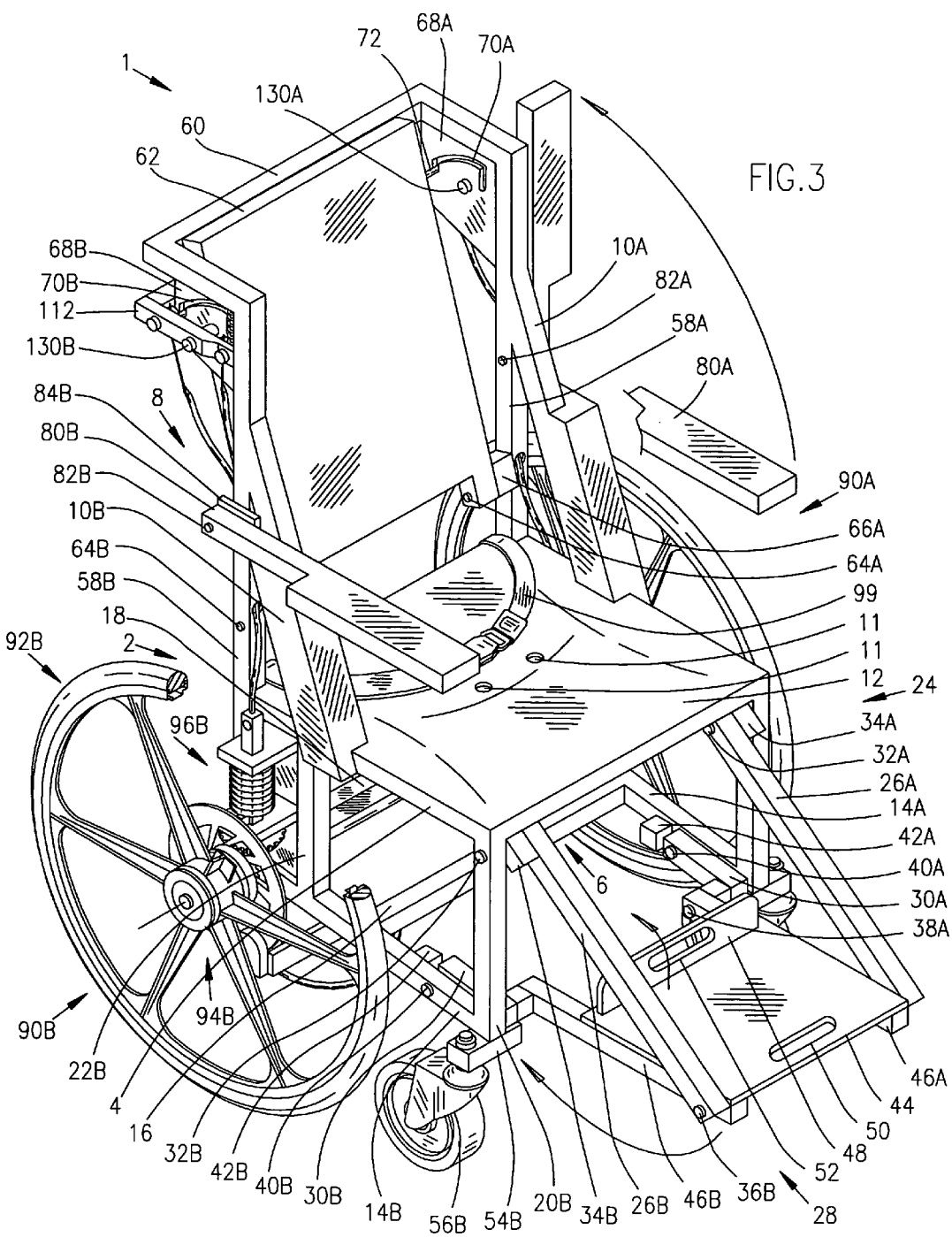
FIG. 3 shows a different perspective view from above of a wheelchair including arrows to show the movement of armrests and collapsible footrest.

A typical embodiment of the device of the present invention is illustrated in FIGS. 1-3. A wheelchair 1 has a rigid chair frame 2, which comprises a seat support 4, an opposing pair of forward vertical legs, 20a and 20b, an opposing pair of rear vertical legs 22a and 22b, a back support 8, and armrest supports 10a and 10b. The seat support 4 is a rigid rectangular horizontal bar. A seat 12 is attached to the seat support 4 and contains holes 11 for drainage. The wheelchair can include a seatbelt 99. A chassis 6 supports the chair frame 2. The chassis 6 comprises an opposing pair of parallel horizontal rigid wheel support bars, 14a and 14b, that are interconnected by a perpendicular forward horizontal rigid brace 16 and perpendicular rear horizontal rigid brace 18.

Figure 4:
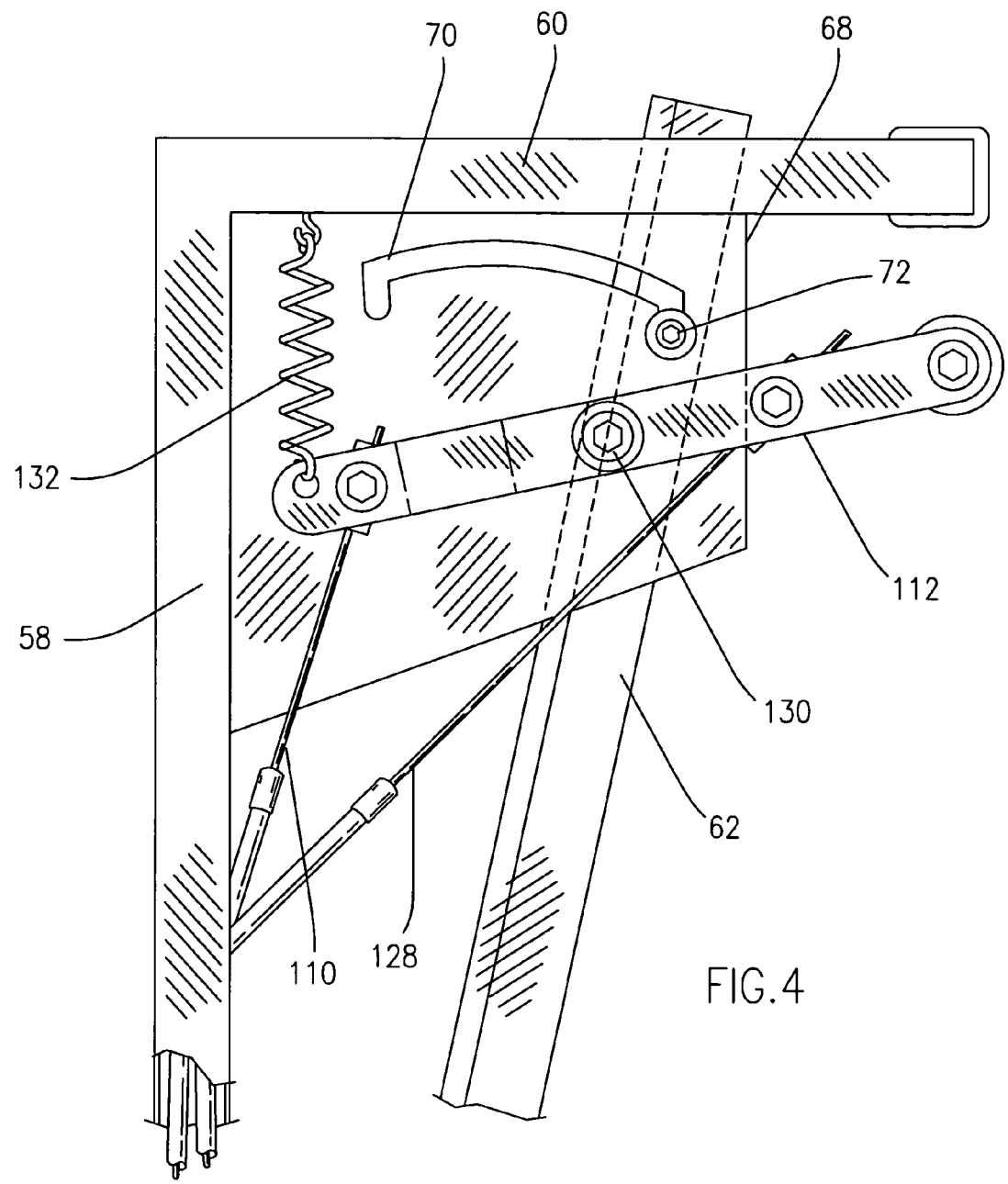
FIG. 4 shows an enlarged fragmentary side view of the wheelchair frame, seat back in slotted guide, and handle to operate the automatic braking and locking devices.

Referring to FIGS. 2-4, the back support 8 comprises opposing vertical back support bars 58a and 58b, a horizontal U-shaped push-bar handle 60, a seat back 62, and seat back guide plates 68a and 68b. The back support bars 58a and 58b connect rigidly to the rear brace 18 of the chassis 6 and the rear of the seat support 4. The push-bar handle 60 connects rigidly to the top of the back support bars 58a and 58b. The bottom of the seat back 62 connects to the back support bars 58a and 58b near the seat 12 by pivot pins or bolts 64a and 64b. Seat back spacers 66a and 66b separate the seat back 62 from the back support 8 to prevent interference as the seat back 62 pivots. Vertical seat back guide plates 68a and 68b connect rigidly to the top of the back support guides 58a and 58b and the push-bar handle 60. The seat back guide plates 68a and 68b contain slots 70a and 70b in the form of arcs with centers at the pivot pins or bolts 64a and 64b. The slots 70a and 70b contain vertical cutouts 71a and 71b along the bottoms of the slots 70a and 70b. A rigid horizontal seat back rod 72 passes through a slot in the seat back 62 and the slots 70a and 70b of the seat back guide plates 68a and 68b. The seat back rod 72 is fastened at each end to keep the seat back rod 72 contained between the two seat back guide plates 68a and 68b. The seat back rod 72 permits a single-handed operation to adjust the seat back 62 through different angles of recline as the seat back rod 72 is placed in different vertical cutouts of the slots 70a and 70b.

Figure 6:
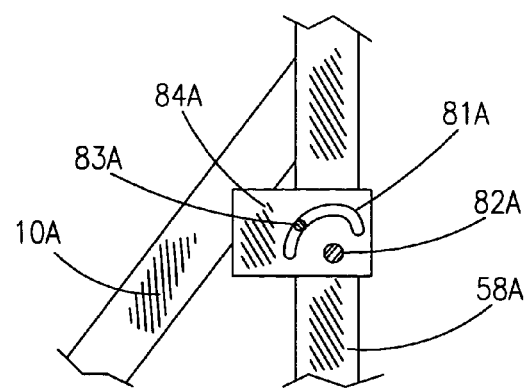
FIG. 6 shows a fragmentary side view of the armrest plate and slot.

Referring to FIGS. 2 and 3, armrests 80a and 80b are attached by pivot pins or bolts 82a and 82b to the back support bars 58a and 58b at a height that is appropriate for occupants to support their arms. Armrest guide plates 84a and 84b are rigidly attached to the inside of the armrests 80a and 80b at the pivot pins or bolts 82a and 82b at the rear of the armrests 80a and 80b. As shown in FIG. 6, the armrest guide plate 84a contains a slot 81a in the form of an arc with center at the pivot pin or bolt 82a. Armrest guide plate 84b contains a slot 81b (not shown) identical to slot 81a with center at the pivot pin or bolt 82b. Pins 83a and 83b (not shown) that are rigidly attached to the back support bars 58a and 58b are placed within the slots and permit the single-handed operation of the movement of the armrests 80a and 80b. The lengths of the slots 81a and 81b (not shown) limit travel of the armrests 80a and 80b from the substantially horizontal forward position to the stowed position that is slightly beyond the upward vertical to prevent the armrests 80a and 80b from falling spontaneously. In the forward position, the armrests 80a and 80b rest on surfaces that extend horizontally from the armrest supports 10a and 10b and beneath the armrests 80a and 80b. The upper ends of the armrest supports 10a and 10b are connected rigidly to the back support bars 58a and 58b above the pivot pins or bolts 82a and 82b. The lower ends of the armrest supports 10a and 10b are connected rigidly to the rear half of the sides of the seat support 4 at a position that permits an occupant to mount or dismount along the side the wheelchair 1.

Referring to FIGS. 2 and 3, a collapsible footrest 24 is attached to the forward vertical legs, 20a and 20b, and the horizontal wheel support bars, 14a and 14b. The collapsible footrest 24 comprises an opposing pair of upper footrest support bars 26a and 26b, a foot support 28, and an opposing pair of lower footrest support bars, 30a and 30b. The foot support 28 comprises a footplate 44, an opposing pair of footplate support bars 46a and 46b, and a heel stop 48. The footplate 44 contains a slot 50 parallel and close to the leading edge to aid in grasping the footplate 44 for the single-handed operation of extending the footrest 24. The heel stop 48 is a plate mounted perpendicularly on the rear of the footplate 44 and contains a slot 52 parallel and close to the top edge to aid in grasping the footplate 44 for the single-handed operation of collapsing the footrest 24. The footplate support bars 46a and 46b are attached below the footplate 44 and are offset toward the center of the footplate 44 at the leading edge so as not to interfere with the travel of the upper footrest support bars 26a and 26b when the footrest 24 collapses. The sides of the footplate 44 are notched for the same reason.

Figure 7:
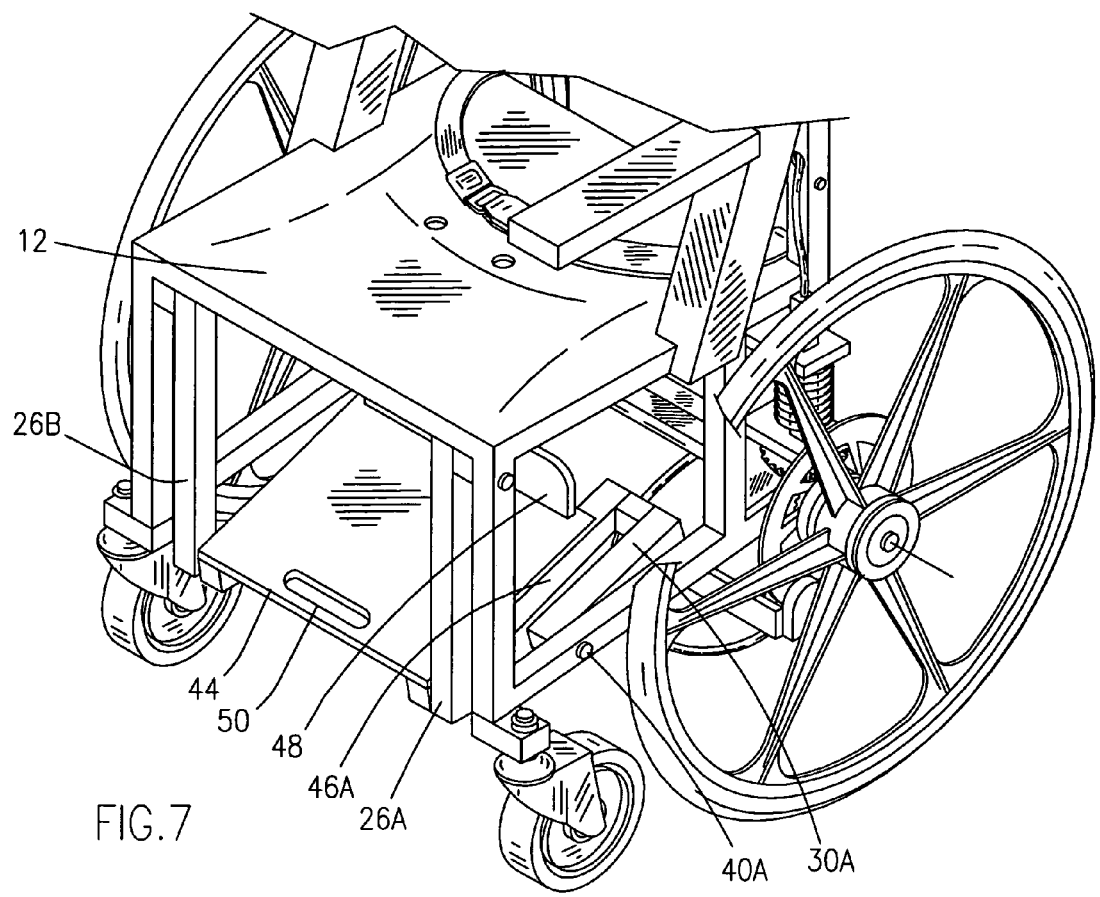
FIG. 7 shows a fragmentary front view illustrating the stowed footrest.

In more detail, and referring particularly to FIGS. 2, 3 and 7, the upper footrest support bars 26a and 26b are connected at the top of the forward vertical legs 20a and 20b by pivot pins or bolts 32a and 32b, respectively, with spacers 34a and 34b in between to provide sufficient offset for the foot support 28 to clear the lower footrest support bars 30a and 30b when the footrest 24 is in the collapsed position. The forward ends of the footplate support bars 46a and 46b are connected to the bottom of the upper footrest support bars 26a and 26b by pivot pins or bolts 36a and 36b, respectively, and at the other ends to the lower footrest support bars 30a and 30b by pivot pins or bolts 38a and 38b, respectively. The lower footrest support bars 30a and 30b are connected to the wheel support bars 14a and 14b by pivot pins or bolts 40a and 40b, respectively. Rear footrest stops 42a and 42b are attached to the wheel support bars 14a and 14b, respectively, to limit the travel of the lower footrest support bars 30a and 30b when the footrest 24 is in the collapsed position. The rear footrest stops 42a and 42b are positioned such that the top of the footplate 44 tips back slightly when the footrest 24 is in the collapsed position. When the footplate 44 is tipped back slightly, the footrest 24 is in a stable storage position and cannot extend spontaneously as shown in FIG. 7. Caster support bars 54a and 54b are attached below and perpendicular to the forward end of the wheel support bars 14a and 14b. The caster support bars 54a and 54b extend inwardly sufficiently to provide rigid stops for the lower footrest support bars 30a and 30b when the footrest 24 is in the extended position. The caster support bars 54a and 54b extend outwardly sufficiently to attach to conventional caster wheels 56a and 56b.

Figure 5:
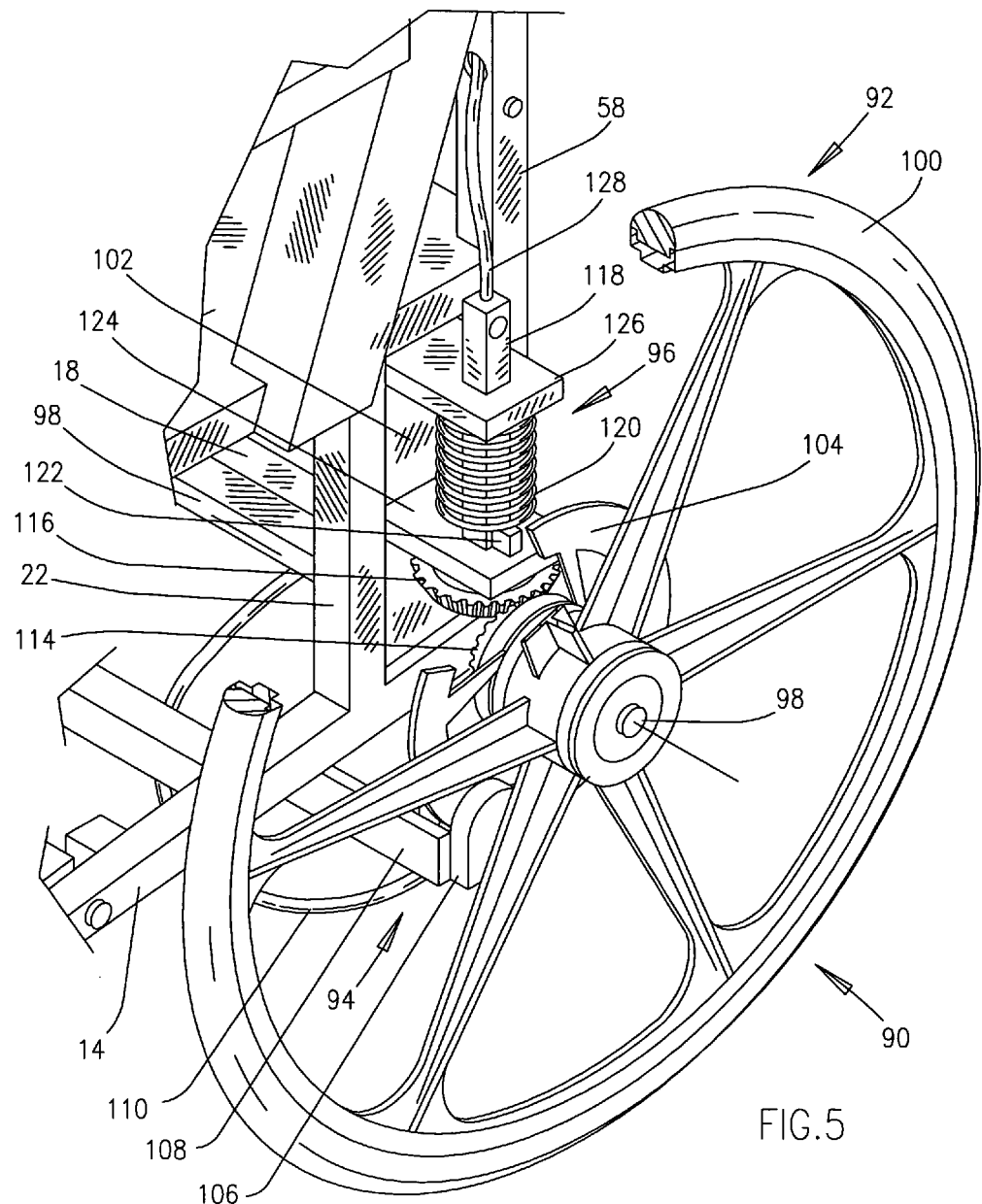
FIG. 5 shows an enlarged fragmentary perspective view of the automatic wheelchair braking and locking devices through a cutaway of the wheelchair wheel.

Referring to FIGS. 2, 3 and 5, a drive assembly 90 comprises a wheel assembly 92, braking assembly 94, and a locking assembly 96. The wheel assembly comprises an axle 98, a conventional wheel 100 on each side, including a tire, rim, hub, and internal bearings, and a drive assembly support plate 102 on each side. The horizontal axle 98 is connected rigidly to the vertical drive assembly support plate 102 that is attached rigidly to the rear vertical leg 22 and the back support bar 58. The rotatable wheels 100 are mounted on the stationary axle 98 and retained by a snap ring (not shown) or other suitable retaining device.

In more detail and referring particularly to FIGS. 2-5, the braking assembly 94 comprises a conventional disk brake that includes a rotor 104, an opposing set of spring-loaded brake pads 106, a braking assembly support 108, and a braking assembly cable 110. The rotor 104 is affixed rigidly to the hub of the wheel 100 and is placed between the opposing set of brake pads 106. The brake pads 106 are affixed rigidly to the braking assembly support 108, which is connected rigidly to the bottom of the wheel support bar 14. The braking assembly cable 110 connects the brake pads 106 to a U-shaped actuator handle 112. The actuator handle 112 is located sufficiently close to the push-bar handle 60 such that an assistant can easily grasp and squeeze both handles at the same time.

In more detail and referring particularly to FIGS. 2-5, the locking assembly 96 comprises a rotative bevel gear 114, a stationary bevel gear 116, a sliding rectangular bar 118, a coil spring 120, a pin 122, a lower locking assembly guide 124, an upper locking assembly guide 126, and a locking assembly cable 128. The bevel gear 114 is affixed rigidly to the rotor 104 and is aligned axially with the horizontal axle 98. The vertical rotationally stationary bevel gear 116 is above and perpendicular to the bevel gear 114 and is offset such that it mates with bevel gear 114 when fully engaged. The bevel gear 116 is connected rigidly to the vertical rectangular bar 118. The rectangular bar 118 passes through the lower locking assembly guide 124 and the upper locking assembly guide 126. The rod 118 is rectangular to prevent bevel gear 116 from rotating. The horizontal lower guide 124 and the horizontal upper guide 126 are affixed rigidly to the drive assembly support plate 102. There is sufficient clearance between the top of the bevel gear 116 and the bottom of the lower locking assembly guide 124 to permit the bar 118 to slide longitudinally to engage and disengage the bevel gear 116 to and from the bevel gear 114. The spring 120 is placed coaxially over the rectangular rod and between the lower guide 124 and the upper guide 126. The spring 120 is seated against the upper guide and held in place by the pin 122, which is affixed to the bar 118 at the bottom of the spring 120. A locking assembly cable 128 connects the top of the bar 118 protruding above the upper guide 126 to the actuator handle 112.

In more detail and referring particularly to FIG. 4, the actuator handle 112 is connected to the seat back guide plate 68 by a pivot pin or bolt 130. A vertical spring 132 connects the leading edge of the actuator handle 112 to the push-bar handle 60.

Operation of Invention

Referring to FIGS. 2 and 3, the transport of an occupant seated in the wheelchair 1 by an assistant is described. The assistant may perform several single-handed operations, including adjustment of the seat back 62, arm rests 80, and the footrest 24, prior to moving the occupant.

The angle of the seat back 62 may be adjusted by moving the seat back rod 72 through slots 70a and 70b in the seat back guide plates 68a and 68b. At least two vertical cutouts in each seat back guide slot 70a and 70b provide multiple positions for the angle of the seat back 62 as shown in FIGS. 2-4. Under normal transport of the occupant, the seat back rod 72 will rest in one of the vertical cutouts in each of the seat back guide plate slots 70a and 70b. The angle of the seat back 62 is changed by pulling the seat back rod 72 up and out of the vertical cutouts in slots 70a and 70b with one hand, gliding the seat back rod 72 along the slots 70a and 70b, and placing the seat back rod 72 in a different set of vertical cutouts, thus adjusting the position of the seat back 62 with a single-handed operation.

Referring to FIGS. 2 and 3, armrests 80a and 80b pivot about pivot pins 82a and 82b between the horizontal extended position and a stowed position that is slightly beyond the upward vertical position. In some circumstances, it may be advantagous for a patient to be assisted into the wheelchair 1 from one of the sides. If the armrest 80 is initially in the extended horizontal position, the assistant may swing the armrest 80 with one hand about the pivot pin 82 until the armrest 80 is in the stowed position. The slot in the armrest guide plate 84 that is rigidly attached to the armrest 80 limits the extent of travel of the armrest 80 as it glides over a stationary pin rigidly attached to the back support bar 58.

Since the stowed position is slightly beyond vertical, the armrest 80 is in a stable position and will not fall down and interfere with the patient getting into or out of the wheelchair 1. Once the patient is seated, the assistant may swing the armrest 80 with one hand down to the extended horizontal position, thus adjusting the armrest 80 to both the stowed and extended positions with single-handed operations. As shown in FIG. 6, the slot 81 in the armrest guide plate 84 that is rigidly attached to the armrest 80 limits the extent of travel of the armrest 80 to a horizontal extended position and the armrest 80 is supported by extensions from the armrest support 10.

The footrest 24 may be collapsed from the extended position to the stowed position and back to the original extended position using easy single-handed operations. If the footrest 24 is originally in the extended position as shown in FIGS. 2 and 3, the footrest 24 can be placed in the stowed position by grasping the slot 52 in the heel stop plate 48 with one hand, pulling up on the footrest 24, and pushing it towards the back of the wheelchair 1 in one sweeping motion. During this process, the lower footrest support bars 30 pivot about the pivot pins 40 towards the back of the wheelchair 1 until they reach the rear footrest stops 42. The upper footrest support bars 26 pivot toward the back of the wheelchair 1 about pivot pins 32. The footplate 44 moves as shown by the arrows in FIG. 1 with the heel stop 48 at the top of the footplate 44 in the stowed position as shown in FIG. 7. The footrest 24 can be returned to the extended position by grasping the slot 50 in the footplate 44 with one hand and pulling the footplate 44 towards the front of the wheelchair 1 in one sweeping motion until the lower footrest support bars 30 reach the stops on the caster support bars 54.

To move the wheelchair 1, an assistant must perform one single-handed operation to simultaneously and automatically release the brake assembly 94 and the locking assembly 96. Without any action on the part of an assistant, the brake assembly 94 and the locking assembly 96 are engaged, which prevent the wheelchair from moving. The lock assembly 96 can be arranged to disengage prior to the brake assembly 94. An operator can then partially squeeze the actuator handle 112 to disengage the lock assembly 96 while maintaining the brake 94 such that a force applied to the push-bar handle 60 can overcome the brake friction and provide slow controlled movement of the chair. Such controlled movement might be desirable in moving a patient down a ramp or into a wheel chair accessible swimming pool for example.

Referring particularly to FIGS. 4 and 5, the spring 132 applies a constant pull on the forward end of the actuator handle 112. The spring 132 also applies tension to the braking assembly cable 110 and, through this action, clamps the brake pads 106 onto the rotor 104. With one hand on the push-bar handle 60, grasping the actuator handle 112 and squeezing it towards the push-bar handle 60 accomplishes the release of the brake assembly 94. The actuator handle 112 pivots about pivot pin 130 when it is squeezed towards the push-bar handle 60 and resists the pull of the spring 132. As the actuator handle 112 pivots, tension in the braking assembly cable 110 is reduced and the brake pads 106 release the rotor 104.

Without any action on the part of an assistant, the compressive force of spring 120 engages the rotationally stationary bevel gear 116 with the bevel gear 114. When the actuator handle 112 is squeezed towards the push-bar handle 60, the locking assembly cable 128 pulls up bar 118 and bevel gear 116. The pin 122 that is rigidly attached to the bar 118 compresses the spring 120.

When the actuator handle 112 is released, spring 132 will pull the braking assembly cable 110 and clamp the brake pads 106 on the rotor 104. Simultaneously, the bevel gear 116 is urged by spring 120 to reengage with bevel gear 114 when the actuator handle 112 is released.

FURTHER EMBODIMENTS OF THE INVENTION

Although the invention is illustrated and described herein with what is considered the preferred embodiment, the specificities of the device should not be construed as limitations on the scope of the invention, but rather as an exemplification of one embodiment thereof Various modifications may be made to this invention without departing from the spirit of this invention and still be within the scope and range of equivalents of the claims.

The preferred embodiment of the wheelchair has a locking assembly and a braking assembly on both rear wheels. However, the functions of braking the wheelchair and locking it can be accomplished with only one wheel containing a braking assembly and a locking assembly. Additionally, the wheelchair can operate with either the braking assembly or the locking assembly and does not require both assemblies to operate.

A further embodiment of the invention is that a single braking assembly and locking assembly can be used if the rear axle rotates. In this embodiment, the axle is supported on the frame by bearings or bushings. The wheels can be attached rigidly to the axles or attached by means of free-wheeling hubs. A single braking assembly and locking assembly can be attached to the axle to perform the same function as that shown in the preferred embodiment.

There are locking members with many different mating surface indentations that may be used for the locking assembly. Any type of gear may be used, including spur gears, bevel gears, helical gears, herringbone gears, and worm gears. A slip clutch can be used where one half of the slip clutch would be attached to the wheel and free to rotate. The mating part of the slip clutch would be attached to the frame and slide parallel to the shaft to mate the rotatable half based on the movement of an actuator.

The positive locking mechanism requires a rod that slides between an upper and a lower guide that engages and disengages the stationary locking member from the rotatable locking member. Any type of slidable rod fitting into a corresponding hole contained within an upper and lower guide provides a positive locking mechanism. The preferred embodiment shows a rod of rectangular cross-section. However, any non-circular cross-section will provide a positive locking mechanism.

In the preferred embodiment of the wheelchair, the brake pads are released from the rotor as the actuator handle is squeezed. A further embodiment is to have the brake pads unclamped to the rotor when the actuator handle is in the released state and clamped to the rotor when the actuator handle is fully depressed. In this embodiment, the locking assembly would still perform as described in the preferred embodiment. By proper adjustment of the braking assembly cable and locking assembly cable, the locking assembly can be released and the wheelchair free to move when the actuator handle is partially squeezed. The braking assembly would be activated with a further depression of the actuator handle until the maximum braking force is applied when the actuator handle is fully depressed.

A further embodiment of the invention is that the braking and locking assemblies can be combined. The rotor can be notched along its perimeter. The spring-loaded sliding rod used in the locking assembly can have an end that mates with a notch. So, instead of the sliding rod engaging the two bevel gears, the sliding rod would engage directly into the rotor and lock the wheelchair. An alternative to the rotor with a notched perimeter is a rotor with radially aligned holes spaced azimuthally and evenly along the side of the rotor. With this arrangement, the spring-loaded sliding rod engages directly with the rotor and must be mounted parallel to the axle. Through proper adjustment of the cables, the braking can be activated before the locking occurs.

A further embodiment of the invention is that any type of friction brake may be used instead of the disk brakes, including brakes with brake shoes and banded brakes.

Many features can be omitted or added without significant change to the function of the wheelchair. The holes can be removed from the seat. Without the holes, liquid can be drained by manually tilting the seat. The heal stop can be removed from the footplate. The extensions on the armrest supports can be removed since the slot in the armrest guide plate will limit the travel of the arm to the horizontal extended position. The seat back adjustment assembly can be eliminated and the seat back can be fixed to the frame. The rear footrest stop can be removed. A seat belt can be added and attached to the frame.

The wheelchair can be constructed from materials, including stainless steel, plastic, nylon, and composite fibers, which will not corrode or rust in water. The wet proofed version of the wheelchair would be suitable for aquatic applications, including showers and pool therapy.

Conclusions, Ramifications, and Scope of the Invention

The present invention discloses an assistive mobility device that provides for an automatic positive locking system, which maintains the mobility device in a stationary position until an operator engages an actuator to unlock the system. The mobility device is relocked automatically once the operator disengages the actuator.

A number of features are disclosed that aid in the functionality of the mobility device. The features may be added depending on the purpose of the mobility device. The features include a braking system, stowable footrest and armrests, a seatbelt, and an adjustable backrest. A method is disclosed of providing the use of a single hand of the operator to operate all features.

Although the embodiments of the invention have been described for a wheelchair, it is anticipated that the assistive mobility device applies to all wheeled carriages, including baby carriages and strollers, patient transfer devices, carts, and wheelchairs. Carts include shopping carts, office carts, and utility carts. Assistive mobility devices share the common features of a chassis supporting a carriage frame and a set of wheels. The carriage frame is a chair frame for a wheelchair, a box frame for a cart, and a bed frame for a patient transfer device. The scope of this invention should be determined not by the embodiments illustrated, but by the appended claims and their legal equivalents.

What is claimed is:

1. An assistive mobility device comprising:
a chair frame for supporting an occupant comprising a plurality of rigid members joined together so as to define said chair frame;
a push-bar handle for providing a motive force to said assistive mobility device through the aid of an assistant, said push-bar handle secured across a rear upper portion of said chair frame;
a substantially horizontal seat attached to said chair frame for supporting an occupant;
a substantially vertical back attached to said chair frame for resting said occupant's back;
a plurality of wheels;
a chassis for supporting said chair frame and said plurality of wheels, said chassis comprising a plurality of rigid members joined together so as to define said chassis, said plurality of wheels arranged on said chassis to distribute weight substantially evenly over a surface;
a locking assembly comprising a rotatable locking member with surface indentations and affixed to one of said plurality of wheels, a stationary locking member with surface indentations that mate with said rotatable locking member, a polyhedral rod connected to said stationary locking member, an upper and lower guide means affixed to said chair frame and containing said polyhedral rod that permit said polyhedral rod to move only slidably and longitudinally such that said stationary locking member may engage and disengage from said rotatable locking member, a spring means between said upper and lower guide means connected to said polyhedral rod and urging said stationary locking member to engage with said rotatable locking member, an actuator handle connected pivotably to the rear upper portion of said chair frame and at a predetermined distance from said push-bar handle such that said assistant may squeeze said actuator handle while holding said push-bar handle connected to said chair frame, and a flexible locking assembly cable means connecting said polyhedral rod to said actuator handle to pull said polyhedral rod when said actuator handle is squeezed to disengage said stationary locking member from said rotatable locking member;

a braking assembly comprising a braking means at one of said plurality of wheels and a flexible braking assembly cable means to connect said braking means to said actuator handle such that said braking means is biased to a clamped state, whereby said braking means is released when said actuator handle is squeezed and clamped automatically when said actuator handle is released.

2. The assistive mobility device of claim 1, further including a footrest comprising a footplate, an upper rigid support connected pivotably to an upper front leg of said chair frame and connected pivotably to a front of said footplate, a lower rigid support connected pivotably to a rear of said footplate and connected pivotably to said chassis at a location such that said footplate may collapse under said seat in a stowed position and rest in a substantially horizontal position when said footplate is retrieved.

3. The assistive mobility device of claim 1, wherein said braking means is a conventional disk brake device comprising a rotor affixed to at least one of said plurality of wheels and a pair of opposing spring-biased brake pads affixed to said chassis.

4. The assistive mobility device of claim 1, further including an armrest assembly comprising at least one armrest pivotably connected to said chair frame, an armrest slot in a proximal end of the armrest, and a pin affixed to said chair frame that fits in the slot of the armrest, whereby said armrest slot limits rotation of the armrest.

5. The assistive mobility device of claim 1, further including a back adjustment assembly comprising a pair of opposing guide plates affixed to an upper rear portion of said chair frame, a guide slot with a plurality of vertical cutouts contained within each of the guide plates, a back slot in the upper rear portion of said substantially vertical back, a seat back rod passing through said back slot in the upper rear portion of the back and each said guide slot in said guide plates and resting in one set of said plurality of vertical cutouts, and lower portion of said substantially vertical back connected pivotably to said chair frame, whereby angle of recline of the back is adjusted by placing said seat back rod in a different set of said plurality of vertical cutouts of said guide plates.

6. The assistive mobility device of claim 1, further including a seat belt.

7. The assistive mobility device of claim 1, wherein said assistive mobility device is formed from materials that are resistant to the corrosive effects of exposure to water, whereby said assistive mobility device can be used in aquatic environments.

8. A method for the single-handed operation of an assistive mobility device, comprising the steps of:
(a) providing a wheelchair comprising a chair frame, a plurality of wheels, a chassis for supporting said wheels and said chair frame, and a push handle for providing motive force to said assistive mobility device, said push bar secured on a rear upper portion of said chair frame,
(b) locking said wheelchair with a locking assembly normally biased to a positive wheel lock position of at least one of said wheels, wherein said locking assembly is operably connected to an actuator handle adjacent to said push handle such that said push handle and said actuator handle can be gripped with one hand to release said lock assembly and lock said lock assembly automatically when said actuator handle is released,
(c) stowing and retrieving a footrest attached to said wheelchair comprising a footplate, an upper support connected pivotably to an upper front of said wheelchair and connected pivotably to a front of said footplate, a lower support connected pivotably to a rear of said footplate and connected pivotably to a lower front of said wheelchair at a location such that said footplate may collapse under said wheelchair in a stowed position with a single-handed operation and rest in a substantially horizontal retrieved position adjacent the front of said wheelchair with a single-handed operation,
(d) stowing and retrieving at least one armrest attached to said wheelchair, whereby said at least one armrest may be rotated with one hand between a substantially vertical stowed position and a substantially horizontal retrieved position,
(e) adjusting a back adjustment assembly attached to said wheelchair such that an angle of recline of a back of said chair frame is adjusted by placing a seat back rod with one hand in a different set of a plurality of vertical cutouts of a guide plate,
whereby, the operation of said assistive mobility device, including locking said assistive mobility device, stowing and retrieving said footrest and said at least one armrest, and adjusting said back, may be performed with one of the assistant's hands thereby freeing the assistant's other hand to secure an occupant.

9. An assistive mobility device comprising:
a carriage frame for supporting a load comprising a plurality of members joined together so as to define said carriage frame;
a push-bar handle for providing a motive force to said assistive mobility device;
a plurality of wheels;
a chassis for supporting said carriage frame and said plurality of wheels, said chassis comprising a plurality of members joined together so as to define said chassis,
a locking assembly comprising a rotatable locking member with surface indentations and affixed to one of said plurality of wheels, a rotationally stationary locking member with surface indentations that mate with said rotatable locking member, a rod connected to said stationary locking member, a guide affixed to said carriage frame and containing said rod that permits said rod to move slidably such that said rotationally stationary locking member may engage and disengage from said rotatable locking member, said rod normally urging said rotationally stationary locking member to engage with said rotatable locking member, an actuator handle connected pivotably to rear upper portion of said carriage frame and at a distance from said push-bar handle such that an assistant may squeeze said actuator handle while holding said push-bar handle connected to said carriage frame, said rod connected to said actuator handle to pull said rod when said actuator handle is squeezed to disengage said rotationally stationary locking member from said rotatable locking member.

10. The assistive mobility device of claim 9, further including a substantially horizontal seat attached to said carriage frame for supporting an occupant.

11. The assistive mobility device of claim 9, further including a footrest comprising a footplate, an upper support connected pivotably to an upper front of said carriage frame and connected pivotably to a front of said footplate, a lower support connected pivotably to a rear of said footplate and connected pivotably to said chassis at a location such that said footplate may collapse under said substantially horizontal seat in a stowed position and rest in a substantially horizontal position adjacent the front of said carriage frame when said footplate is retrieved.

12. The assistive mobility device of claim 9, further including a braking assembly comprising a brake at one of said plurality of wheels and a flexible braking assembly cable to connect said brake to said actuator handle such that said brake is biased to a clamped state, whereby said brake is released when said actuator handle is squeezed and automatically clamped when said actuator handle is released.

13. The assistive mobility device of claim 12, wherein said brake is a conventional disk brake device comprising a rotor affixed to at least one of said plurality of wheels and a pair of opposing spring-biased brake pads affixed to said chassis.

14. The assistive mobility device of claim 9, further including an armrest assembly comprising at least one armrest pivotably connected to said carriage frame, an armrest slot in a proximal end of the armrest, and a pin affixed to said carriage frame that fits in the slot of the armrest, whereby said armrest slot limits the rotation of the armrest.

15. The assistive mobility device of claim 9, further including a substantially vertical back attached to said carriage frame.

16. The assistive mobility device of claim 15, further including a back adjustment assembly comprising a pair of opposing guide plates affixed to an upper rear portion of said carriage frame, a guide slot with a plurality of vertical cutouts contained within each of the guide plates, a back slot in the upper portion of said substantially vertical back, a seat back rod passing through said back slot in the upper portion of the back and each said guide slot in said guide plates and resting in one set of said plurality of vertical cutouts, and lower portion of said substantially vertical back connected pivotably to said carriage frame, whereby angle of recline of the back is adjusted by placing said seat back rod in a different set of said plurality of vertical cutouts of said guide plates.

17. The assistive mobility device of claim 9, further including a seat belt.

18. The assistive mobility device of claim 9, wherein said assistive mobility device is formed from materials that are resistant to the corrosive effects of exposure to water, whereby said assistive mobility device can be used in aquatic environments.

19. An assistive mobility device comprising:
a first handle for providing a motive force to said assistive mobility device, said first handle secured on a rear upper portion of a carriage frame;
a plurality of wheels;
a chassis supporting said carriage frame and said plurality of wheels;
a locking assembly including a rotatable locking member with indentations and affixed to at least one of said plurality of wheels, a rotationally stationary locking member with indentations that mate with said rotatable locking member and slidably affixed to said chassis wherein said locking assembly is normally biased to a wheel lock position of at least one of said plurality of wheels;
a second handle operably connected to said locking assembly wherein said second handle is adjacent said first handle such that said first and second handle can be gripped with one hand to release the wheel lock and to provide motive force to said assistive mobility device.

20. The assistive mobility device of claim 19, further including an armrest assembly comprising at least one armrest pivotably connected to said mobility device.

21. The assistive mobility device of claim 19, further including a substantially horizontal seat attached to said carriage frame.

22. The assistive mobility device of claim 19 further including a footrest comprising a footplate, an upper support connected pivotably to an upper front of said mobility device and connected pivotably to a front of said footplate, a lower support connected pivotably to a rear of said footplate and connected pivotably to said mobility device at a location such that said footplate may collapse under said carriage frame in a first position and rest in a second position substantially horizontally adjacent a front portion of said mobility device.

23. The assistive mobility device of claim 19, further including a substantially vertical back pivotably connected to said carriage frame.

24. The assistive mobility device of claim 19, further including a friction brake operably connected to said second handle and normally biased to a braking position by a first spring to brake at least one of said plurality of wheels and said locking assembly normally biased to said wheel lock position by a second spring wherein gripping said first and second handles overcomes said first and second springs, whereby allowing said assistive mobility device to move.

25. An assistive mobility device including
a carriage,
at least one wheel,
a frame supporting said carriage and said at least one wheel,
a push handle attached to said frame behind said carriage,
a wheel lock including a rotatable locking member with indentations and affixed to said at least one wheel, a rotationally stationary locking member with at least one indentation that mates with said rotatable locking member and slidably affixed to said frame wherein said wheel lock is normally biased to engagement to lock said at least one wheel,
an actuator handle operably connected to said wheel lock and adjacent said push handle, wherein said actuator handle and said push handle are gripped simultaneously to release said wheel lock to non-engagement, whereby releasing said at least one wheel to roll.

26. The assistive mobility device of claim 25, further including a brake operably connected to said actuator handle and normally engaged to brake said at least one wheel wherein said wheel lock disengages prior to said brake as said actuator handle is drawn towards said push handle such that as force applied to said push handle can overcome said brake when said wheel lock is disengaged.

27. The assistive mobility device of claim 25, further including a footrest pivotably connected to a front of said frame at a location that said footrest may collapse under said carriage in a first position and rest in a second position substantially horizontally adjacent a front portion of said mobility device.

28. The assistive mobility device of claim 25, further including an armrest assembly comprising at least one armrest pivotably connected to said mobility device.

29. The assistive mobility device of claim 25, further including a substantially vertical back pivotably connected to said carriage.

* * * * *